United States Patent [19]
Stubbs

[11] 3,896,692
[45] July 29, 1975

[54] APPARATUS FOR CUTTING ELONGATE ARTICLES

[76] Inventor: Mayo P. Stubbs, P.O. Box 131, Colorado City, Ariz. 86021

[22] Filed: Apr. 16, 1973

[21] Appl. No.: 351,152

[52] U.S. Cl. .............. 83/471.3; 83/486.1; 83/467; 83/522
[51] Int. Cl.² .......................................... B27B 5/20
[58] Field of Search ......... 143/DIG. 6; 83/467, 468, 83/485, 486, 471.3, 471.2, 564, 581, 522, 486.1; 269/8

[56] References Cited
UNITED STATES PATENTS

| | | | |
|---|---|---|---|
| 869,309 | 10/1907 | Kramer | 83/468 |
| 2,619,134 | 11/1952 | West | 83/468 |
| 2,629,410 | 2/1953 | Cadwell | 83/485 |
| 3,022,994 | 2/1962 | Eklund | 269/8 |
| 3,368,594 | 2/1968 | Drumbore | 83/467 |
| 3,827,326 | 8/1974 | Martin | 83/471.2 |

Primary Examiner—Donald R. Schran
Attorney, Agent, or Firm—Mallinckrodt & Mallinckrodt

[57] ABSTRACT

Apparatus for cutting elongate structural workpieces, such as lumber, into shorter pieces at selected positions along their lengths comprises a generally horizontal, elongate guide frame attached to one side of an elongate worktable and extending transversely across the worktable. The guide frame, in one embodiment, has one side thereof pivotally attached to the side of the elongate worktable so as to be swingable from a position extending transversely across the worktable to a position extending substantially parallel with the length of the worktable along one side thereof. The guide frame is adapted to have a power saw slidably mounted thereon for movement back and forth along the guide frame. Track means are positioned along and parallel with the one side of the worktable. Stop members are slidably mounted on the track means to provide adjustable abutments with the workpieces at selected locations determining lengths of smaller pieces cut from the longer pieces, therebeing in one embodiment a gap intermediate the length of the worktable through which the cut pieces drop after being cut off.

13 Claims, 8 Drawing Figures

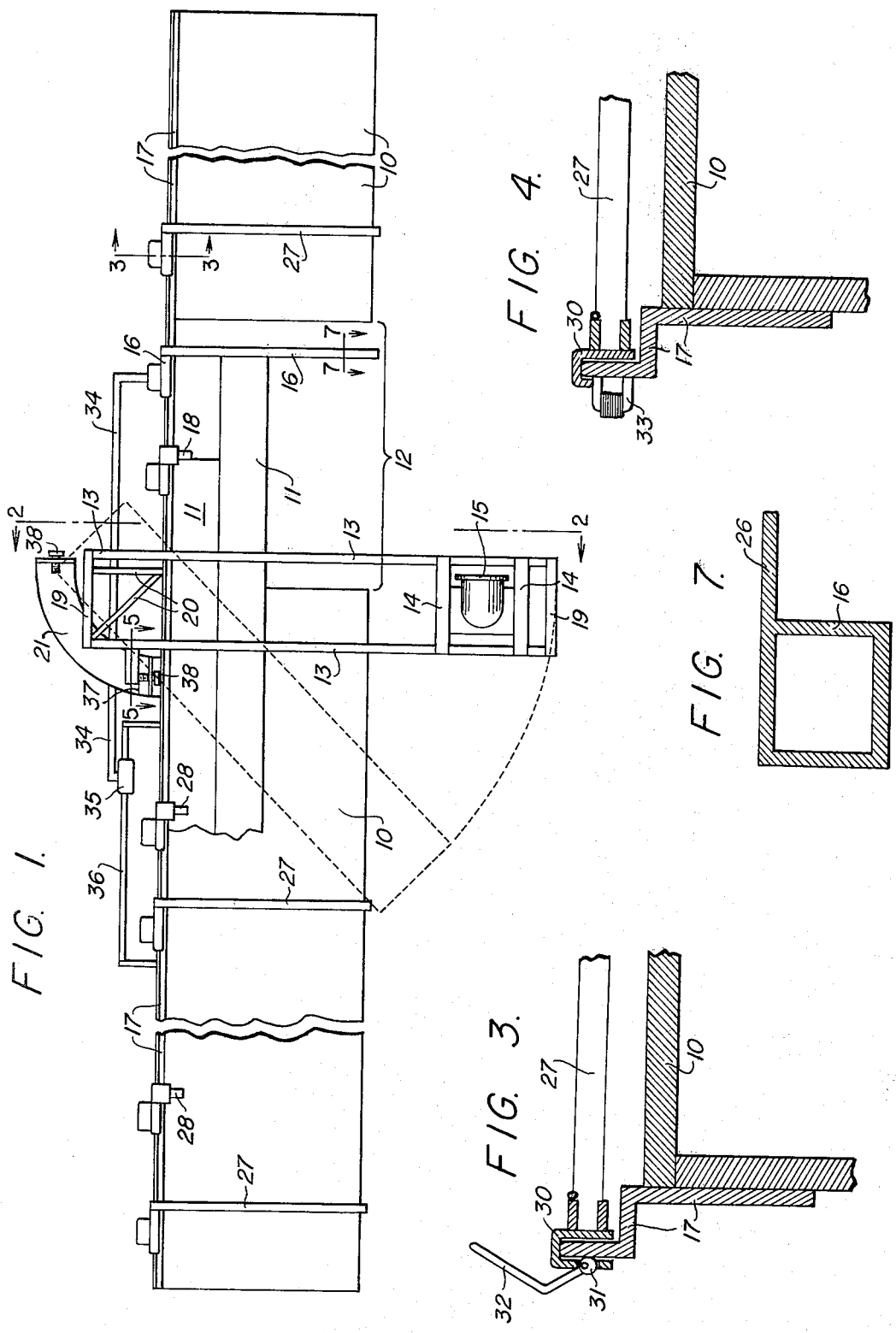

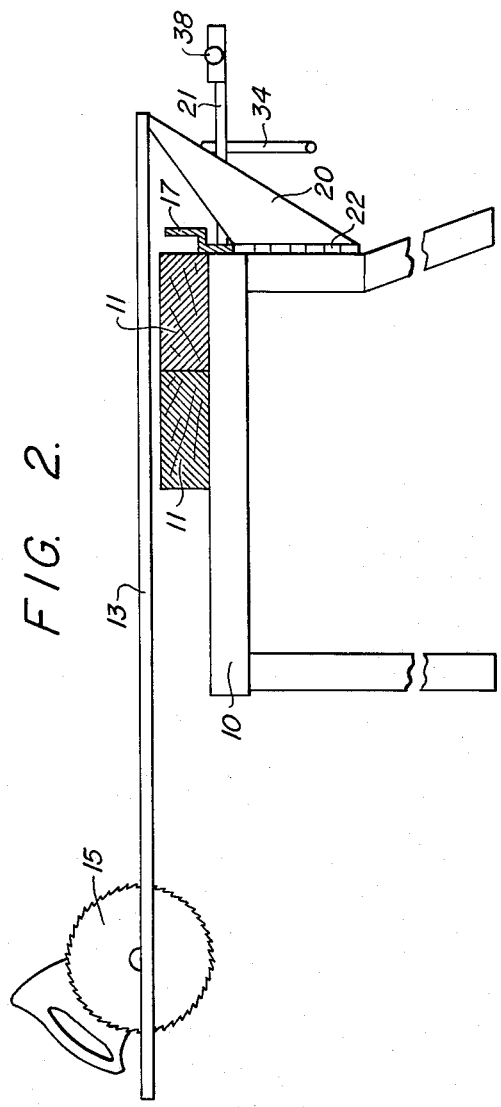
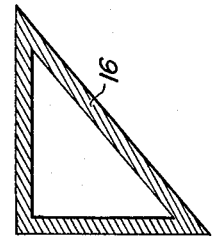
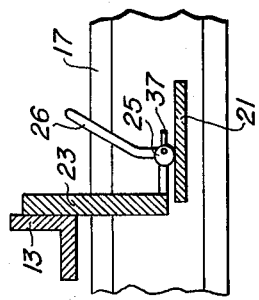
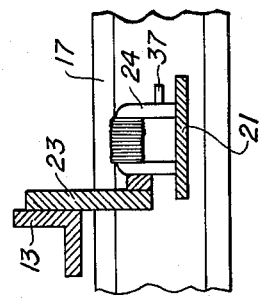

3,896,692

APPARATUS FOR CUTTING ELONGATE ARTICLES

BACKGROUND OF THE INVENTION

Field

The invention is directed to apparatus for cutting elongated workpieces, such as lumber used in building wall panels, at selected positions along the length of the workpieces.

State of the Art

Apparatus for marking and cutting elongated lengths of what are commonly known as "two by four" pieces of lumber is disclosed in U.S. Pat. No. 3,674,064. Such apparatus comprises a longitudinally extending table for supporting the workpieces and a marking template arranged in side-by-side relationship with the table. A circular saw is attached to one end of the table for pivotal movement in an arc across the table. However, this apparatus is cumbersome, and the cutting of multiple lengths of the lumber workpieces is slow and inefficient. In particular, when a long length is to be cut into a plurality of smaller pieces, such as the spacers used in fabricating what is commonly known as an "end block" of a wall panel, the template is used to mark a series of points along the workpiece. The workpiece is then moved along the table and the first mark lined up with the saw blade. The saw blade is then "pivoted" across the table, cutting the workpiece. The workpiece is repeatedly positioned so that each of the subsequent marks, in turn, is in line with the saw blade, and a cut is made for each mark. Such a procedure is time consuming and subject both to erroneous measurements and incorrect positionings of the individual marks in line with the saw blade, thus, resulting in cut pieces of non-uniform lengths. Because of the pivotal movement of the saw, the apparatus in U.S. Pat. No. 3,674,064 is also limited to cutting one member at a time, and, further, the apparatus cannot be used to cut a workpiece at an angle to the longitudinal axis of such workpiece.

SUMMARY OF THE INVENTION

In accordance with the present invention, relatively inexpensive apparatus is provided for rapidly and efficiently cutting elongate workpieces into shorter lengths to be used in the fabrication of frame wall structures.

The apparatus comprises an elongate worktable upon which the workpieces, such as lumber "two by fours," "two by sixes," etc., are supported. A guide frame is attached to one side of the table, and has a pair of parallel track members disposed in a horizontal plane generally parallel to and above the workpiece receiving and supporting surface of the worktable. A support member is slidably mounted on the track members and is adapted to mount a power saw, whereby the power saw and support member are moveable as a unit along the parallel track members. One end of the guide frame can be attached to one side of the worktable for swinging movement about an axis normal to the surface of the worktable, thus, the guide frame is rotatable from a position extending transversely across the worktable to a position substantially parallel to the side of the worktable and vice versa. Means are provided for releasably holding the guide frame in a fixed position at any point along the path of swing of the guide frame.

The worktable has track means and a tape measure extending in side-by-side relationship along one of its sides. In one particular embodiment of the apparatus, either the guide frame is attached to the end of the worktable, and the track means and tape measure extend longitudinally beyond the end of the table, or a gap is provided intermediate the length of the worktable with the saw adjacent one of the sides of the gap. An adjustable stop member is slidably mounted on the track means, so that the stop member extends perpendicularly from the track means and parallel to the end of the table. The stop member is arranged to abut the ends of elongate workpieces that extend beyond the end of the worktable or over the gap in the table. The stop member is either shaped or positioned so that it makes contact with the ends of the workpieces only along the top edge thereof. It has been found that when the end portion of the workpieces abutting the stop member are cut off by the saw, the severed portion of the workpiece will fall free of the saw and table, from the end thereof or through the gap, only when the stop member makes contact with the upper edges of the ends of the workpieces. When the stop member makes contact with a substantial portion of the ends of the workpieces, the severed portions do not fall free of the saw and table, but rather, wedge between the saw blade and the stop members.

Stop members are also slidably mounted on the track means extending along the side of the worktable. The stop members extend generally parallel to and just above the surface of the worktable. Means are provided for securing the stop members in fixed positions along the track means.

DRAWINGS

The device illustrated in the accompanying drawings represents the best mode presently contemplated of carrying out the invention, although it is recognized that the inventive concepts here taught can be utilized in a variety of specific forms within the scope of the claims.

FIG. 1 is a top plan view of apparatus according to this invention.

FIG. 2 is a cross section, end view taken along line 2—2 of FIG. 1.

FIGS. 3 and 4 are partial views taken along line 3—3 of FIG. 1 showing separate embodiments of means for adjustably securing the stop member to the track means.

FIGS. 5 and 6 are partial views taken along line 5—5 of FIG. 1 showing separate embodiments of the means for adjustably securing the swingable guide frame in a fixed position at a point along the path of swing thereof.

FIGS. 7 and 8 are cross sectional views taken along line 7—7 of FIG. 1 showing separate embodiments of the stop member which abuts the ends of workpieces extending from the end or over the gap of the worktable.

DETAILED DESCRIPTION OF THE PREFERRED EMBODIMENTS

The apparatus illustrated in FIGS. 1-8 comprises an elongate worktable 10 upon which workpieces 11 are supported. A guide frame comprising a pair of parallel track members 13 is attached to one side of worktable 10 so that the track members 13 are disposed in a horizontal plane generally parallel to and above the workpieces 11 on worktable 10. A support member 14 is slidably mounted on the track members 13 of the guide frame and is adapted to have a power saw 15 mounted thereon, whereby the power saw 15 and support member 14 are movable as a unit along the parallel track members 13 of the guide frame. The guide frame extends transversely across worktable 10. In one particular embodiment, as illustrated in the drawings, one side of the guide frame is pivotally attached to one side of the worktable 10 so that the guide frame can rotate from a position extending transversely across worktable 10 to a position generally parallel with the side of worktable 10.

Referring to FIGS. 1 and 2, the parallel track members 13 are connected together by cross members 19 to form the guide frame unit. One end of the guide frame is pivotally attached to the side of worktable 10 by securing plates 20 to the cross members 19 at one end of the guide frame and attaching plates 20 to the side 21 of worktable 10 by means of hinge 22. Hinge 22 is positioned so that its axis is normal to the surface of worktable 10. Preferably, the axis of hinge 22 also coincides with the line formed by the intersection of the plane of the saw blade on saw 15 and the plane of the side of the work surface, whereby the line of travel of saw 15 intersects the same point on the side of the worktable 10 irrespective of the angular position of the guide frame.

In the embodiment illustrated in FIGS. 1 and 2, plates 20 extend upward and away from the side of worktable 10 so that the guide frame extends sufficiently beyond the side of worktable 10 for saw 15 to traverse the entire width of worktable 10.

In the embodiment illustrated, wherein the guide frame is pivotally attached to the side of worktable 10, means are provided for releasably holding the guide frame is fixed positions along the rotational travel of the guide frame. As shown, the means comprises a substantially horizontal plate 21 extending from the side of worktable 10 to which the guide frame is attached. Holding means are attached to the side of one of the track members 13 of the guide frame. Plate 21 has an arcuate shape and holding means is positioned directly over plate 21. The holding means 22 remains directly over plate 21 as the guide frame rotates due to the arcuate shape of plate 21.

Two separate embodiments of the holding means are illustrated in FIGS. 5 and 6. Both FIGS. 5 and 6 are partial elevations taken along line 5—5 of FIG. 1 showing cross sectional views of the track members 13, the holding means and plate 21. In FIG. 5, a support plate 23 is attached to track means 13. An electromagnet 24 is affixed to support plate 23 so that the pole pieces of electromagnet 24 are in sliding contact with the arcuate shaped plate 21. Means, not shown in the drawings, are provided for energizing the electromagnet, whereby the poles of the electromagnet hold tightly against plate 21 thereby holding the guide frame in a fixed position. When the electromagnet 24 is de-energized, the poles of the electromagnet will again slide over plate 21.

In FIG. 6, support plate 23 is attached to track means 13 and an off-center cam member 25 is affixed to support plate 23. The off-center cam member 25 can be rotated such as by the handle 26 so that the cam is brought into holding contact with plate 21. The guide frame is held against movement when the cam is in contact with plate 21, and when the cam is rotated back from contact with plate 21, the guide frame is again free to move.

The worktable 10 of this invention can have a gap 12 in the work surface intermediate the length of worktable 10 as shown in FIG. 1, or worktable 10 can have a continuous work surface (for purposes of this invention, intermediate is defined as any point between two specified points and not necessarily the midpoint between the two points). In the embodiment wherein the work surface of table 10 is continuous, the guide frame can be attached to the end of the worktable or at any point between the ends of the table.

When the worktable is to be used mainly for cutting multiple smaller places from a longer workpiece, it is advantageous to have the guide frame positioned at the end of the worktable or adjacent a gap 12 in the worktable as shown in FIG. 1. In such instances, the short pieces which are cut from the longer workpieces fall freely from the end of the worktable or through gap 12 in the worktable, whereupon, the longer workpieces are then repositioned for another cutting.

In the embodiment wherein the guide frame is positioned at the end of the table or adjacent a gap in the work surface of the table, it is preferable to have the guide frame attached to the side of the table so that the line of travel of the saw blade is slightly beyond the end of the table or over the free space of gap 12 in the table. This allows the end of the short cut-off piece near the saw blade to fall free from the end of the table or through gap 12 in the table.

Repeated repositioning of the longer workpieces 11 on worktable 10, for accurate and uniform cutting of smaller pieces therefrom, is accomplished with the apparatus of the present invention without measuring or marking of the longer workpieces and without requiring the operator of the apparatus to manually line up marks on the longer workpieces with the line of travel of the saw blade.

As illustrated in FIGS. 1 and 2, a track means 17 extends longitudinally of worktable 10 and spans the gap 12 on one side of the worktable 10. In the alternate embodiment, where the work surface is continuous and does not have a gap therein, the track means 17 extends longitudinally from the end of the table in line with one of the sides of the worktable. Such a worktable can be envisaged by simply deleting the portion of worktable 10 in FIG. 1 which is to the right of gap 12, leaving the track means 17 extending freely from the left hand portion of worktable 10.

Stop member 16 is slidably mounted on track means 17, and thus, can be positioned therealong at various distances from the line of travel of the saw blade. Stop member 16 has an elongate portion extending perpendicularly from track means 17 so that the ends of elongate workpieces 11 will abut against the elongate portion of member 16. In cutting shorter pieces from a longer workpiece, the stop member 16 is positioned at the desired distance from the saw blade; this distance being the desired length of the shorter pieces which are to be cut from the longer workpiece. Stop member 16 is held in the set position by means in combination with stop member 16 for releasably securing the stop member 16 at any point along track means 17. The elongate workpieces 11 are then placed on worktable 10 in parallel relationship with the sides of the table and their ends abutting stop member 16. Saw 15 is pushed along the guide frame thereby cutting the elongate workpieces. The severed shorter pieces fall through gap 12 in worktable 10. A bin or other collector means can be placed under gap 12 for collecting the shorter pieces as they are cut from the longer workpieces.

More than one stop member can be slidably mounted on track means 17. As shown in FIG. 1, two different sized short pieces can be cut from two longer workpieces 11 with one cut of the saw by using two stop members. When using more than one stop member, those members situated between the saw blade and the most distant stop member must not extend all the way across the worktable 10. In FIG. 1, stop member 18 is positioned between the saw blade and stop member 16. Stop member 18 is used to cut desired shorter sections than obtained using stop member 16. Both size sections can be obtained simultaneously with one cut of the saw blade by placing one elongate workpiece 11 on the worktable 10 with its end abutting stop member 18. One or more additional workpieces 11 are then placed on worktable 11 with their ends abutting stop member 16. One stroke of the saw then cuts two different sized lengths of sections from the workpieces 11.

Stop member 18 preferably has a spring actuated latch which extends from track means 17 so that the side thereof abuts the end of workpiece 11. In such latch members the latch can be depressed towards the track means by a force directed along the latch towards the track means 17. Thus, if stop means 18 is not to be used, it need not be removed from track means 17. Instead, the workpiece 11 is placed on the worktable with its end extending beyond stop member 18. The workpiece is then pushed towards the side of worktable 17 depressing the latch of stop member 18. The workpiece is then moved longitudinally on the worktable 10 until its end is abutting stop member 16.

Stop member 18 can also be mounted on track means 17 so as to be pivotable about an axis parallel with and adjacent to track means 17 as well as slidable along track means 17. With the pivotal type stop member, the portion thereof extending from the track means 17 can be rotated upward and away from the worktable 10 so that it will not interfere with workpieces 11 on worktable 10 when it is not being used.

The stop members 16 and 18 preferably should contact only the top edge of the end of the elongate workpieces 11. The stop members can be positioned so that only the bottom edge of the stop members abuts the top edge of the ends of the workpieces 11, or the stop members can be shaped so that only the top edge of the ends of the workpieces 11 are contacted when the ends are abutted against the stop members. It has been quite unexpectedly found that by having the stop members abut only the top edge of the ends of workpieces 11, the shorter pieces being cut from the longer workpieces will fall freely from the end of the table or through gap 12 without wedging between the stop members and the saw blade. When a substantial portion of the ends of the workpieces are contacted by the stop members, the tendency for the cut-off sections to wedge between the stop member and the saw blade is increased greatly. When only the top edge of the workpieces are abutted by the stop members, there is no tendency at all for the cut-off sections to wedge between the stop members and the saw blade.

Two preferred cross-sectional shapes for the stop members are shown in FIGS. 7 and 8. In FIG. 7, stop member 16 has a protrusion 26 extending from the upper portion thereof. The end of protrusion 26 then abuts only the upper edge of the ends of the workpieces. In FIG. 8, the stop member is shown three sided having a cross-sectional shape of a triangle. The side of the three sided stop member of FIG. 8, which abuts the ends of workpieces 11 slants away from the ends of the workpieces 11. Thus, only the top edge of the ends workpieces 11 make contact with the triangular shaped stop member. Because the side of the stop member in FIG. 8 is slanting, various widths of workpieces can be sawed, and in all cases, only the top edge of the end of the workpieces will contact the stop member.

When the worktable is to be used primarily for cutting shorter pieces from longer workpieces, the guide frame need not necessarily be attached to the side of the table for pivotal movement. The guide frame can be fixed in permanent extension across the end of the worktable or in fixed position adjacent the gap 12 of worktable 10. In addition, as pointed out hereinbefore, the gap section 12 need not be included in the table. However, the versatility of the apparatus of this invention is increased immensely by providing pivotal movement of the guide frame as well as an extension of the work surface of the table on each side of the saw. In those cases where short segments are to be cut from longer workpieces and the worktable is also to have an extension of the work surface on each side of the saw, the preferred embodiment of the apparatus is shown in FIG. 1 wherein a gap 12 separates the work surfaces on each side of the saw.

In the particular embodiment illustrated in the drawings, worktable 10 has a gap 12 therein and the guide frame is attached to the side of the worktable 10 for pivotal movement as fully explained hereinbefore. The track means extend along the entire length of one side of the worktable 10. Stop members 16 and 18 are slidably positioned on the track means as described above. Additional stop members 27 and 28 can also be slidably mounted on the track means 17. The stop means 28 are in all respects similar to stop means 18 described hereinbefore. Stop means 27 are similar to stop means 16, however, they need not have any special shape or position as described above with respect to stop member 16. All the stop means, 16, 17, 27 and 28 have means associated therewith for releasably securing them in any position along the length of the track means 17.

Particular means for releasably securing the stop members to the track means are shown in FIGS. 3 and 4. The track means 17 is attached to the side of worktable 10 and extends just above the surface of the worktable. This lip helps in positioning workpieces along the table in parallel with the side of the table. The track means 17 is then bent back away from the worktable 10 and then bent upwards. The top of the small horizontal section of track means 17 is conveniently used to place a tape measure on so that the tape means extends parallel along the length of the table. The tape measure is useful in positioning the stop members in desired positions along the track means 17.

As shown in FIGS. 3 and 4, stop member 27 is pivotally attached to an inverted, generally U-shaped member 30 which straddles and is supported on the upstanding leg of track means 17. In FIG. 3, the inverted U-shaped member 30 has an off-center cam 31 associated therewith. A handle 32 is connected to the off-center cam 31 for rotational movement of cam 31. When cam 31 is rotated its off-center portion joins against the track means 17 and prevents further sliding movement of the stop member 27 along track means 17. When the cam is rotated back away from the track means 17, stop member 27 can again be moved along track means 17.

The apparatus in FIG. 4 is similar to that in FIG. 3 except that the handle 32 and cam 31 have been replaced with an electromagnet 33. The poles of the electromagnet 33 are in rubbing contact with the side of track means 17. When electromagnet 33 is energized, the poles thereof hold tightly against track means 17 and prevents movement of stop member 27. When the electromagnet is de-energized, the stop means 27 can again be moved along track means 17. When an electromagnet is used as the means for releasably securing the guide frame as discussed above or for releasably securing the stop members on the track means, the plate or track means which are in contact with the poles of the electromagnet must be made of a material which is attracted by a magnet.

Means for adjusting the position of stop means 16 is shown in FIG. 1 wherein stop means 16 is connected by a connecting rod 34 to a slidable member 35 positioned on a runner 36. In normal operation, the operator of the saw stands to the left of the guide frame and can adjust the position of stop member 16 by sliding slidable member 35 back and forth along runner 36.

In addition to cutting smaller pieces from larger workpieces, as described hereinbefore, the apparatus shown in the drawings is very useful in cutting larger pieces to an exact size and especially of cutting two or three pieces from a long workpiece. When cutting larger pieces to an exact size, the slidable stop members 27 are positioned either at one end or both ends of the worktable so that the distance from the saw blade to each of the stop members 27 is the same as the desired length of the cut piece. The workpieces are then placed on the worktable 10 in parallel with the sides of the table and the ends of the workpieces are abutted against the stop member 27. When the workpieces are so positioned, the saw is pushed across the guide frame thus cutting all the workpieces to an exact and uniform length without measuring or marking the workpieces. When the stop members are positioned on both ends of the table, the operator can work from either end of the worktable.

Different lengths can be cut using one stroke of the saw by positioning stop members 28 corresponding to the smaller of the lengths and stop member 27 for the longer lengths. The workpieces are placed on worktable 10, abutted against the respective stop members, and then cut.

The apparatus shown in the drawings can very efficiently cut two pieces of equal or different sizes from one workpiece with a minimum of movement of the workpiece on worktable 10. Stop member 27 on one end of the table is set to the desired length of one of the final pieces, and stop member 28 is set on the other end of the table to the desired length of the other final piece. The single long workpiece is placed on worktable 10 so as to depress stop member 28 and abut stop member 27. The saw then is pushed along the guide frame cutting the workpieces into one piece of desired length and a remaining piece. The remaining piece is then moved in a direction towards the saw until stop member 28 is released. The remaining piece is then abutted into stop member 28 and cut to the desired length of the second piece. Thus, two currect sized pieces are cut from a single long workpiece with very little movement of the longer workpiece on the worktable 10.

If the ends of the desired cut pieces are to be cut at an angle to the longitudinal axis of the worktable 10 rather than square, the guide frame is rotated to the appropriate position and releasably secured in the set position and described hereinbefore. The arcuate plate 21 can conveniently be marked in compass style and a pointer 37 attached to holding means on the guide frame for positioning the guide frame at correct angle positions. Stop members 38 are positioned at the ends of arcuate plate 21 for quickly bringing the guide frame back to a position of being perpendicular to the longitudinal axis of the worktable 10 or parallel to the sides of worktable 10.

Whereas this invention is here described and illustrated with respect to certain forms thereof, it is to be understood that many variations are possible. In particular, the invention is conveniently described with reference to the cutting of lumber structural members, however, it is to be recognized that the invention is not limited thereto, and that cutting of other structural members, such as metal and synthetic resin members, is also within the scope of this invention.

I claim:

1. Apparatus for cutting elongate workpieces comprising and elongate worktable having a substantially horizontal work surface for supporting said workpieces; a guide frame having a pair of parallel track members in a generally horizontal plane above said workpieces on the worktable, said guide frame extending transversely across the worktable at one end of said work surface of the worktable; a support member slidably mounted on said track members, said support member being adapted to mount a power saw thereto, whereby said support member and power saw are movable as a unit along said parallel track members; said worktable having track means extending longitudinally outward from said one end of said work surface in line with one of the sides of said table; an elongate stop member slidably mounted at one of its ends on said track means and extending perpendicularly from said track means whereby workpieces extending longitudinally beyond said one end of said work surface will abut said stop member; and means for releasably securing said adjustable stop member in fixed positions along said track means.

2. Apparatus as claimed in claim 1 means for pivotally attaching said guide frame to the worktable at one side thereof for pivotal movement of said guide frame about an axis normal to said surface, whereby said guide frame can rotate from a position extending transversely across said worktable to a position, generally parallel to the side of said worktable.

3. Apparatus as claimed in claim 2 wherein said axis extends through a point defined by the intersection of a line along the edge of said table and the line of travel of the saw blade.

4. Apparatus as claimed in claim 2 wherein the means for releasably holding said guide frame in a fixed position comprises an off-center cam member attached to the hinged end of said guide frame; a generally horizontal plate extending from the side of said table, said plate being positioned such that said cam member is directly over said plate throughout the travel of said guide frame; and means for rotating said cam member into locking contact with said plate at any position along the travel of said cam member.

5. Apparatus as claimed in claim 2 wherein the means for releasably holding said guide frame in a fixed position comprises an electromagnet attached to the hinged end of said guide frame; a generally horizontal plate extending from the side of said table; said plate being positioned such that the poles of said electromagnet are in sliding contact with said plate throughout the rotation of said guide frame whereby when said electromagnet is energized locking contact is made with said plate at any position along the travel of said electromagnet.

6. Apparatus as claimed in claim 1 wherein said adjustable stop member makes contact with only the top edge portions of the ends of said workpieces whereby when the saw cuts across the workpieces, the sawed off portion extending from the end of the worktable falls freely away from the saw blade without wedging between the saw blade and the stop member.

7. Apparatus as claimed in claim 6 wherein the side of said stop member abutting said material has an outwardly extending portion along the top thereof which contacts the top edge portions of the ends of said workpieces.

8. Apparatus as claimed in claim 6 wherein the side of said stop member facing said one end of said work surface makes an acute angle with the top edge portion of the workpiece sloping away therefrom, whereby only the top edge portion of said workpiece makes contact with the stop member.

9. Apparatus as claimed in claim 1 wherein the means for releasably securing said adjustable stop member along said track means comprises an off-center cam attached to the stop member and means for rotating said cam into locking contact with said track means.

10. Apparatus as claimed in claim 1 wherein the means for releasably securing said adjustable stop member along said track means comprises an electromagnet attached to said stop member so that the magnetic poles of said electromagnet makes sliding contact with said track means whereby when said electromagnet is energized locking contact is made with said track means.

11. Apparatus as claimed in claim 1 wherein additional stop members are slidably mounted to said track means.

12. Apparatus as claimed in claim 11 wherein said additional stop members are mounted on said track means for pivotal movement about an axis along the length of said track means as well as for sliding movement along said track means, whereby said stop members can rotate from a generally horizontal position over said worktable to a position extending away from said worktable.

13. Apparatus as claimed in claim 12 wherein said worktable has a gap in the work surface thereof intermediate the ends of said worktable, said track means extending continuously from one end of said worktable, along the side of said gap to the other end of said worktable, with said guide frame extending across the worktable at one of the ends of said work surface defining an edge of said gap.

* * * * *